United States Patent Office 2,985,304
Patented May 23, 1961

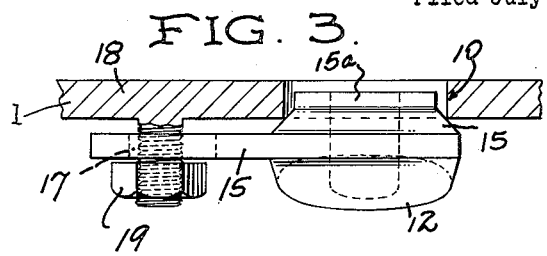
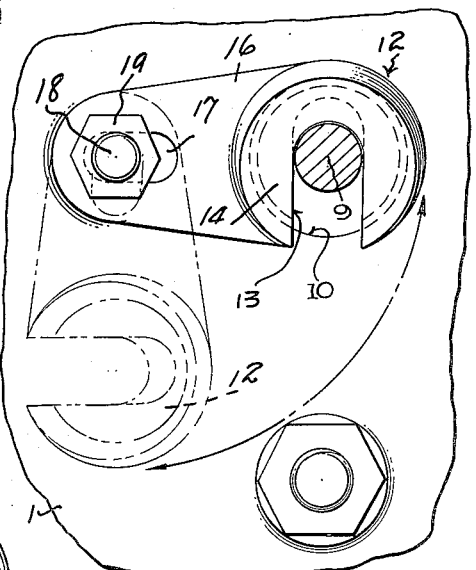
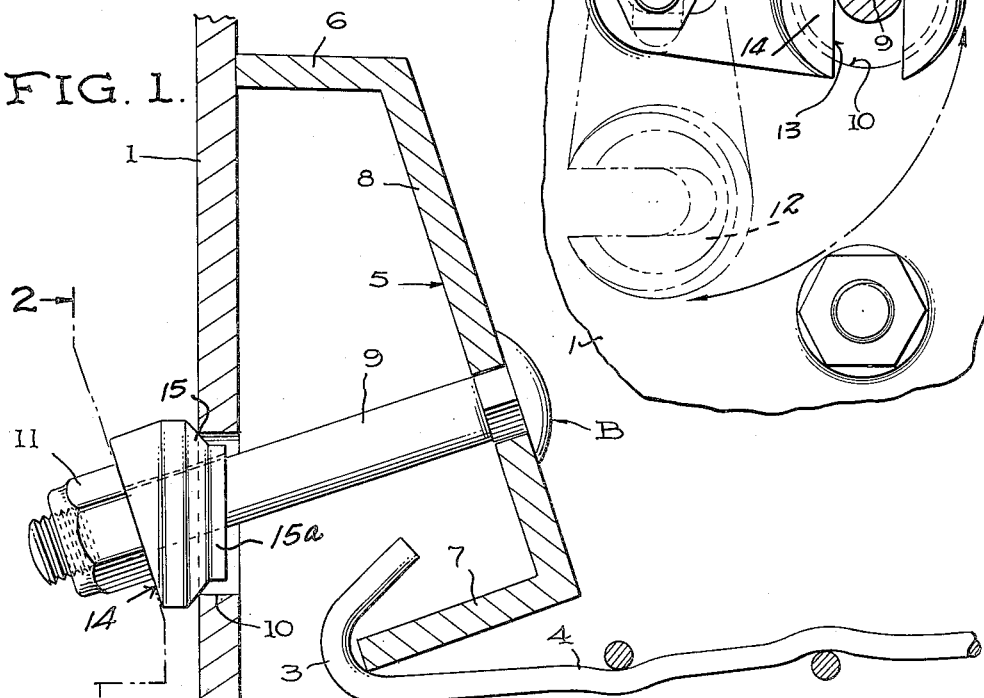
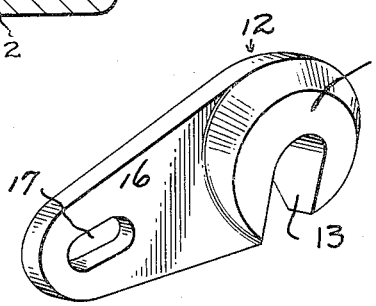
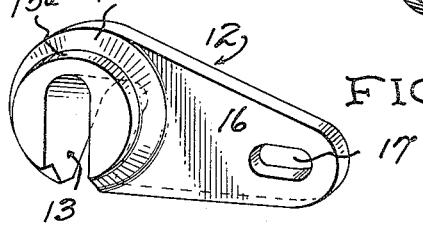

2,985,304

CLAMPING DEVICE FOR VIBRATING SCREEN

Anton W. Chryst and Paul G. Kuhn, Minneapolis, Minn., assignors to Poor & Company, Chicago, Ill., a corporation of Delaware Filed July 31, 1959, Ser. No. 830,898

5 Claims. (Cl. 209—408)

This invention relates to heavy duty vibrating screens of the type used in the classification and recovery of aggregates for road building and the like, and more particularly to an improvement in clamping devices for holding the individual screens on the screen frames.

Screens of this type are subjected to severe operating conditions and replacement has been a tedious and laborious procedure because it has usually required considerable dismantling of parts for its execution. The same comment would apply in making changes to screens of different mesh.

Accordingly, one of the objects of the invention is to provide a practical screen clamping construction which obviates the objections set forth and permits the clamping bar for the screen to be readily released from interlocking engagement with the screen mesh itself and allows the bolt and clamping bar assembly to be pulled clear of the mesh without having to remove the nut from the bolt, the hole in the pan side for the bolt being large enough so that the nut can freely pass through it. In that connection, it is proposed to use a bearing washer larger than the diameter of the bolt hole in the pan side and having a radial slot and a self-seating face in the form of a portion of a cone or sphere for automatically aligning itself in the aforesaid enlarged bolt hole.

When the screen clamping bar is to be removed, it is only necessary to back the nut off the bolt for a few turns, displace the slotted washer laterally at right angles from the shank of the bolt, and pulled the clamping bar and bolt assembly from the frame and screen cloth. This washer is preferably captive in the sense that it is loosely connected with the pan side so that when it is disconnected from the bolt it will not drop out of reach. Thus, since the nut need not be fully removed from the bolt, the nut as well as the washer are tethered so that neither will become separated from their related parts and inadvertently lost.

With the above and other objects which will more readily appear as the nature of the invention is better understood, the same consists in the novel construction, combination, and arrangement of parts, hereinafter more fully described, illustrated and claimed.

A preferred and practical embodiment of the invention is shown in the accompanying drawings in which:

Figure 1 is a vertical sectional view of the pan side and mesh supporting frame, a screen end, and a screen mesh clamping bar assembly.

Figure 2 is a detail front elevation taken on line 2—2 of Figure 1 and shows a plan view of the slotted washer in full lines and in seated position, with the tethered displaced position shown by dotted lines.

Figure 3 is a horizontal cross-section through the stud for the slotted tethering arm of the washer shown in Figure 2.

Figures 4 and 5 respectively, are front and rear perspective views of the washer.

Similar reference numerals designate corresponding parts throughout the several figures of the drawing.

Referring to Figure 1, it will be observed that the screen pan side 1 is provided with a screen supporting frame angle 2 upon which the bent up substantially U-shaped end 3 of the screen mesh 4 rests.

For the purpose of holding the screen 4 in place under appropriate tension, the clamping bar 5 is provided. This bar includes a bearing leg 6 and a screen engaging leg 7 connected by a web 8 and perforated to receive the shank 9 of a bolt B whose head engages the outer face of the web 8 of the clamping bar.

The screen pan side 1 is provided with an opening 10 which is of larger diameter than the shank 9 of the bolt and also of larger diameter than the nut 11 so that the shank 9 and nut 11 may freely pass therethrough, but, since it is not necessary to remove the nut from the bolt, the nut will not be lost.

The opening 10 is punched or drilled and requires no reaming or other operations to be useful in connection with the self-aligning captive washer unit 12. As shown in Figs. 1 to 5, the washer 12 is provided with a radial slot 13, and the face 14 against which the nut 11 bears is at right angles to the axis of the bolt but oblique to the outer face of the pan side, while its bearing face 15 is frusto-conical. The diameter of the washer 12 and the taper of the surface 14 are such that the washer 12 may readily seat in the outer edge of the opening 10 and readily adjust to the position of the shank of the bolt because of the shape of the surface 15. This surface terminates in a lead collar 15ᵃ which assists 15 in moving to proper position.

As shown the rounded or spherical surface 15 is disposed generally oblique to the axis of the bolt but parallel to the outer face of the pan side.

The washer 12 is provided with a radially disposed anchoring or tethering arm 16 having a stud receiving closed slot 17 loosely fitting over a stud 18 carried by the pan side 1 and held thereon by self locking nut 19. The stud 18 may be in the form of a bolt whose shank may be welded to the pan side by "stud welding." This stud has its inner end abutting against the pan side or plate and electricity jumping the gap between the face of the plate and the end of the stud fuses the material and welds the stud to the plate in a cantilever manner. The stud carries the lock nut 19. The arm 16 has sufficient universal play between the nut and the pan side to permit the tapered surface 15 and collar 15ᵃ to completely clear the hole 10 after the nut 11 on the shank 9 of the clamping bar bolt has been loosened to enable the washer to swing clear of the opening 10. In other words, after the nut 11 has been partly backed off the threads of the bolt 9, the washer 12 may be moved in a plane parallel to the outer face of the pan side by axially removing the tapered portion 15 and its lead collar 15ᵃ from its normally seated position in the opening 10.

The washer 12 with the arrangement described will not fall away from the pan side when it is moved to clear the opening 10.

When the washer has been moved laterally, clear of opening 10 on an axis which is the stud 18, the clamping bar may be pulled away from the pan side and the holding edge of the screen mesh 4 with the nut 11 able to pass through opening 10 but still engaged with the threads on the bolt.

When it is desired to replace the screen 4, it is only necessary to also replace bar 5 and re-insert the nut 11 through the opening 10, with the bearing or fulcruming leg 6 of said bar engaging the screen pan side 1, and the clamping leg 7 engaging and interlocking with the edge 3 of the screen. The slotted self-aligning bearing washer 12 may then be swung or rotated on the stud 18 until the slot is in position to receive the shank of the bolt 9. Then, the self-seating and self-aligning washer may be advanced so that its frusto-conical face 15 continues to pass over the bolt shank until said lead collar 15ª and said frusto-conical face fit into the opening 10.

We claim:

1. A readily assembled and disassembled mounting for heavy duty screens supported in a pan side frame having an opening whose axis is substantially parallel with the plane of the screen, a clamping member for said screen, and means for readily connecting and disconnecting said member to hold or free the screen, said means including a bolt secured to said clamping member, a nut on the outer end of said bolt and in tethered relation thereto, said nut being smaller than the diameter of the opening in said pan side frame to freely pass therethrough, and an arm having an integral bearing washer for said nut, said washer having a lateral slot and also having a frusto-conical portion of larger diameter than said opening to provide self-aligning contact therewith, and means co-operating with said slot for tethering said arm to said frame.

2. In a mounting for heavy duty screens including, the screen pan side having an opening and a clamping bar for the screen, of a bolt carried by said bar and having a nut of a diameter to pass through said opening, and a slotted washer of larger diameter than said opening and fitted beneath the head of the bolt and having a self-aligning portion bearing on the edges of said opening, whereby, upon backing the nut on the bolt away from the washer, said washer may be laterally withdrawn to release the bolt and its nut for removal from the screen pan side with the clamping bar.

3. In a mounting for heavy duty screens as set forth in claim 2, wherein, the opening in the pan side is disposed in a vertical plane and the shank of the axis of the bolt is at substantially right angles to the inclined web of the clamping bar and passes through said opening at an oblique angle thereto.

4. In a mounting for heavy duty screens according to claim 2, wherein the self-aligning portion of the washer is frusto-conical.

5. Means for tethering a washer for a bolt and nut passing through related openings in the clamping bar of a heavy duty screen and a pan side, comprising, a relatively elongated arm having a stud receiving slot at one end disposed in the direction of the longitudinal axis of the arm for receiving a stud carried by said pan side, said arm also having an annular conical centering portion on its rear wall for self-adjusting seating in the opening of the pan side, and an integral washer on the outer face of the arm opposite said centering portion, said washer disposed at the end of the arm opposite said slot and having an outer bearing face for the nut on said bolt substantially parallel to the clamping bar and also disposed downwardly and inwardly oblique to the outer face of the pan side to provide a portion of minimum thickness having an outwardly opening slot to receive the shank of the bolt.

References Cited in the file of this patent
UNITED STATES PATENTS

| | | |
|---|---|---|
| 213,703 | Steele | Mar. 25, 1879 |
| 2,090,767 | Sayers | Aug. 24, 1937 |
| 2,774,477 | Pollitz | Dec. 18, 1956 |
| 2,809,208 | Van Hardefeld | Aug. 27, 1957 |
| 2,813,629 | Brugmann | Nov. 19, 1957 |